United States Patent [19]

Jackson

[11] Patent Number: 4,854,991
[45] Date of Patent: Aug. 8, 1989

[54] TUBE FORMING APPARATUS AND METHOD

[75] Inventor: Keith Jackson, Minerva, Ohio

[73] Assignee: J. C. Baxter Co., Canton, Ohio

[21] Appl. No.: 163,987

[22] Filed: Mar. 4, 1988

[51] Int. Cl.⁴ ............................................. C03B 37/02
[52] U.S. Cl. .................... 156/195; 156/143; 156/353; 156/429
[58] Field of Search .............. 156/143, 144, 195, 425, 156/428, 429, 190-192, 64, 353

[56] References Cited

U.S. PATENT DOCUMENTS

| | | | |
|---|---|---|---|
| 2,405,909 | 8/1946 | Smith | 493/301 X |
| 2,630,157 | 3/1953 | Smellie | 156/143 X |
| 3,424,204 | 1/1969 | Sato | 493/301 X |
| 4,026,690 | 5/1977 | McClellan | 65/2 |
| 4,299,147 | 11/1981 | Rogers | 493/299 X |

FOREIGN PATENT DOCUMENTS

079729 9/1970 Japan .................................. 156/143

Primary Examiner—David Simmons
Attorney, Agent, or Firm—Renner, Otto, Boisselle & Sklar

[57] ABSTRACT

Apparatus and method for producing, on a commercial scale, forming tubes of high quality and uniformity including one or more beads on the outer periphery of the tubes which terminate a desired distance from the tube end edges by sequentially cutting the bead cord material to the desired length and at the desired time relative to the tube ends and feeding such cut bead cord material between selected tube plies during the winding of the plies on a mandrel to form tubular material and then cutting the tubular material to form tubes of the desired length. Also, such apparatus and method provide for the picking up and rolling of the beads which are interrupted on the outer periphery of the tubular material and the subsequent cutting of the tubular material intermediate such bead interruptions.

36 Claims, 5 Drawing Sheets

TUBE FORMING APPARATUS AND METHOD

BACKGROUND OF THE INVENTION

This invention relates generally, as indicated, to apparatus and method for making forming tubes out of paper or the like, including particularly the apparatus and method by which one or more beads are formed on the outer periphery of the tubes during manufacture.

During the processing of glass fiber, molten glass is passed through one or more drawing dies which produce a number of very fine glass fiber filaments that are formed into a single strand and subsequently wound around the outer surface of paper forming tubes. After the desired amount of glass fiber has been wound on the forming tubes, the glass fiber is further processed, following which the forming tubes are partially collapsed and removed from the interior of the glass fiber windings so that the glass fiber can be unwound by grasping the interior end. Because of the method of processing glass fiber, such forming tubes must have good wet strength and be resistant to both heat and centrifugal forces. Also, the forming tubes must be sufficiently flexible to permit them to be partially collapsed so that they can be removed from the interior of the glass fiber windings.

It is conventional practice to make such forming tubes by helically winding a plurality of separate plies of paper or paper-like material around a stationary mandrel and bonding such plies together using a suitable water-resistant adhesive as disclosed, for example, in U.S. Pat. No. 4,026,690, the disclosure of which is incorporated herein by reference.

Also, it is conventional practice to provide such forming tubes with one or more beads or ridges on the exterior surface of the forming tubes, formed by depositing one or more cords between selected tube plies during the tube manufacture. Such beads help to retain the glass fibers on the forming tubes during the winding process. To prevent the glass fibers from tracking along the beads as they are wound around such tubes, one of the beads may be laid down in an irregular weave pattern. For ease of manufacture, the beads were generally made to extend all the way to the end edges of the forming tubes. However, as is well known, that can result in the bead ends working their way out of the tube end edges even though the forming tubes are sealed along the tube edges. When this occurs, the ply laminations will pull apart and allow water to get in between the plies where the beads exit from the forming tube edges, thus causing premature delamination, which severely limits the number of times the forming tubes can be used.

It has long been known that this type of delamination can be substantially eliminated by terminating the beads inwardly (i.e., short of) the end edges of the forming tubes. However, heretofore there was no known apparatus and method for producing such forming tubes on a commercial scale of the desired high quality and uniformity.

SUMMARY OF THE INVENTION

With the foregoing in mind, it is a principal object of this invention to provide apparatus and method for efficiently producing, on a commercial scale, forming tubes of high quality and uniformity including one or more beads on the outer periphery of the tubes which terminate a desired distance from the tube end edges.

In accordance with one aspect of the invention, such apparatus and method provide for precisely controlling the spacing between the end edges of the forming tubes and the ends of the beads inwardly of such end edges.

Also in accordance with the invention, such apparatus and method provide for controlling the desired length of the bead cord material deposited between selected tube plies to form beads of the desired length during the tube forming operation.

Further in accordance with the invention, such apparatus and method provide for the automatic feeding and cutting of the bead cord material to the desired length and location relative to the tube ends during the tube forming operation.

Still further in accordance with the invention, such apparatus provides for the precise control and operation of both the tube and bead cutters during the tube forming operation.

In accordance with another aspect of the invention, such apparatus and method provide for the automatic picking up of the interrupted (cut) bead ends and rolling of the tube material on opposite sides of the interrupted beads during the tube forming operation.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figures 1, 2:
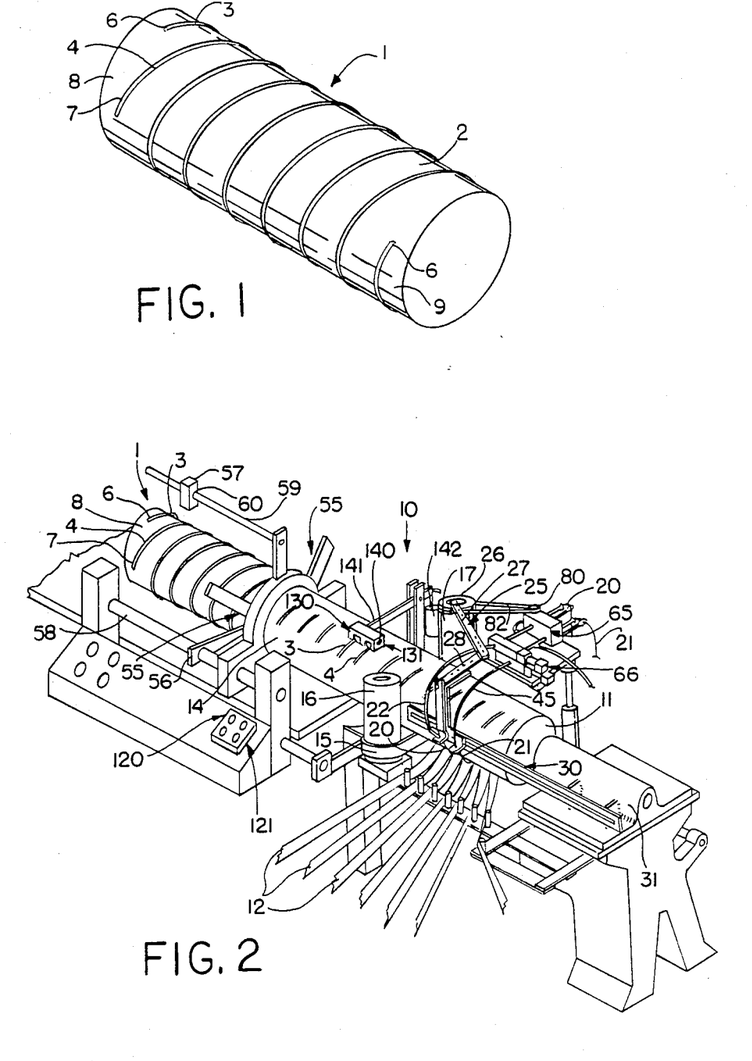
FIG. 1 is an enlarged schematic perspective view of a forming tube of known type which may be made on a commercial scale utilizing the apparatus and method of the present invention.
FIG. 2 is a schematic perspective view of the tube forming apparatus of the present invention shown being used to make the forming tube of FIG. 1.

Referring now in detail to the drawings, and initially to FIG. 1, there is shown a forming tube 1 of conventional type made from a plurality of spiral wrapped plies 2 of paper or paper-like material bonded together using a suitable water-resistant adhesive. The tube diameter and length may be varied within certain limits according to specifications set by manufacturers who use such forming tubes in the processing of glass fiber and the like.

To increase the adherence of the glass fibers to the outer periphery of the forming tube, one or more continuous beads 3, 4 are desirably provided in the outer periphery of the tube. In the example shown in FIG. 1, two such beads 3, 4 are provided, with the ends 6, 7 of each bead desirably terminating some suitable distance from the end edges 8, 9 of the forming tube, for example, one-half inch, so that the bead ends cannot work their way out of the tube end edges and cause premature delamination of the tube plies in the manner previously described.

FIG. 2 schematically illustrates apparatus 10 according to the present invention for use in manufacturing the forming tube 1 of FIG. 1. As shown, such apparatus 10 includes, inter alia, a fixed mandrel II about which any desired number of plies 12 of paper or paper-like material are spirally wrapped and bonded together while the resulting tubular material 14 is continuously rotated and advanced relative to the mandrel. To that end, a continuous belt 15 is shown partially wrapped around the tube material 14 and driven at the desired speed by a drive motor (not shown) which drives one of two roller shafts 16, 17 about which the belt 15 is wrapped, as well known in the art.

During the initial wrap of the plies 12 around the mandrel II, one or more bead cords 20, 21, made, for example, of twisted kraft paper, may be fed between any two of the plies to produce the desired beads or ridges 3, 4 on the outer periphery of the tube material. In the particular example shown in FIG. 2, two such cords are being fed between selected plies to form two beads 3, 4 on the outer periphery of the tube.

One or both such cords 20, 21 may be laid down in a regular spiral pattern if desired. However, preferably one of the cords, for example, cord 20, is laid down in a weave pattern, caused by moving the outlet end of its associated guide tube 22, which deposits the bead cord material between the desired plies, back and forth. This has the advantage that when glass fibers are wrapped around the resulting forming tube, the glass fibers will not track along the tube beads.

Figure 3:
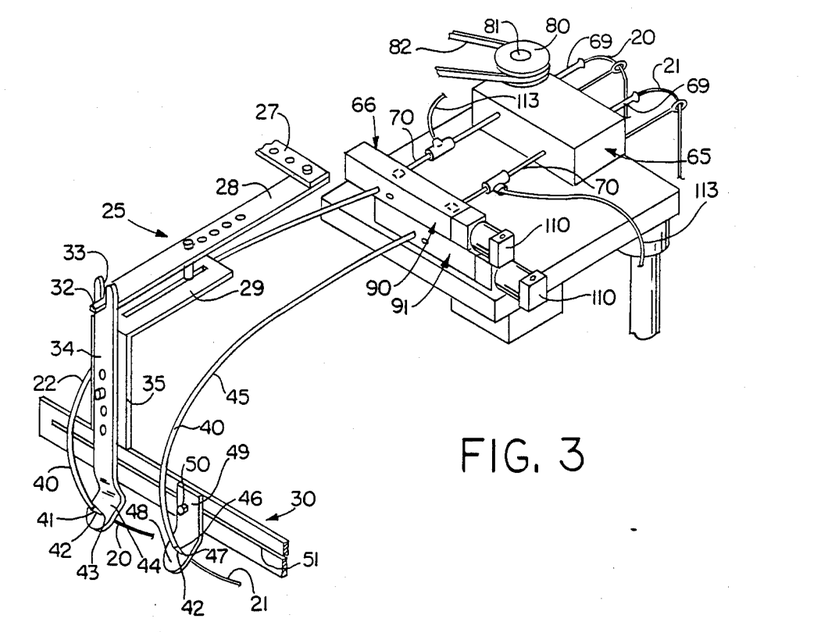
FIG. 3 is an enlarged schematic perspective view of the feed roll assembly and bead cord cutter assembly which forms part of the apparatus of FIG. 2.

Referring further to FIG. 2 and also to FIG. 3, such back and forth movement of the bead cord guide tube 22 is obtained by a suitable linkage mechanism 25 which may be driven off a drive pulley 26 connected to the drive roll 17 used to rotate drive belt 15. As shown, such linkage mechanism includes a first drive arm 27 having one end connected off center with respect to the drive pulley 26. The other end of the first drive arm 27 is connected to one end of a second drive arm 28 which is in turn pivotally connected intermediate its ends to a horizontal flange portion 29 of a bead cord guide support member 30 attached to a stationary part 31 of the tube forming apparatus 10. The other end of the second drive arm 28 has a reduced section 32 for receipt in a slot 33 in the upper end of a vertical weaving arm 34 pivotally mounted intermediate its ends to a vertical flange portion 35 of the bead guide support member 30.

The bead cord guide tube 22 desirably consists of an outer flexible conduit 40 having a copper tubing 41 extending through the center thereof to provide a smooth guide suface for the bead cord material so that the bead cord material does not get hung up inside the guide tube. Also, the copper tubing 41 desirably protrudes slightly beyond the discharge end of the flexible conduit 40 to facilitate attachment of the guide tube to the vertical weaving arm 34 as by inserting the protruding end 42 into a hole 43 in an outwardly bend lower end portion 44 of the vertical weaving arm (see FIG. 3).

As will be apparent, rotation of the drive pulley 26 causes a reciprocating movement of the first drive arm 27 which in turn causes both the second drive 28 and vertical weaving arm 34 to oscillate about their respective pivots to obtain the desired back and forth motion of the outlet end of the bead guide tube 22.

The other bead guide tube 45 is relatively fixed, and, like the bead guide tube 22 previously described, desirably consists of an outer flexible conduit 40 having a copper tubing 42 inserted therethrough to provide a smooth guide surface for the bead cord material 21 passing therethrough. Also, the copper tubing of the bead guide tube 45 desirably protrudes beyond the discharge end of the associated flexible conduit to a slight extent, to permit such protruding end 46 to be inserted into a hole 47 in an outwardly bent end portion 48 of a mounting plate 49. The mounting plate 49 is in turn attached to the guide support member 30 by a bolt 50 passing through the plate and a longitudinal slot 51 in the guide support member, with a nut on the back side to permit adjustment of the location of the relatively fixed guide tube 45 anywhere along the length of the guide support member.

The weave pattern of the one bead cord 20 can readily be adjusted utilizing different mounting holes in the various linkage members 27, 28 and 34 to change the relative lengths and/or pivot points therefor. Likewise, the relative spacing between the two bead cords 20, 21 can readily be changed by adjusting the location of the other guide tube 45 along the length of the guide support member 30.

Forming tubes 1 of the desired length are cut from the outboard end of the advancing tubular material 14 as by means of a pair of cutter knife assemblies 55 (see FIG. 2) on opposite sides of the mandrel II located adjacent its outboard end. The cutter knife assemblies 55 include carriages 56 which may be activated by an electric eye 57 sensing the outboard end of the tube material to cause the carriages 56 to move axially along with the tube material on guide rails 58 while the knives are pressed into engagement with the tube material to cut off tubes 1 of the desired length as the tube material is continually rotated and advanced by the belt 15, in a manner well known in the art. The position of the electric eye 57 may be adjusted, for example, by supporting the electric eye on a fixed rod 59 radially outwardly of the tube (mandrel), with a slidable connection 60 therebetween, to permit the cutting of forming tubes 1 of different lengths.

If the bead cord material 20, 21 were continuously laid down between selected tube plies 12 without interruption, the bead material would extend all the way to the ends of each forming tube as the forming tubes were cut from the tube material 14. However, as previously indicated, the presence of the ends of the bead material at the end edges of the forming tubes causes a more rapid deterioration of the forming tubes, thereby reducing their useful life.

The apparatus and method of the present invention substantially eliminates this type of delamination problem by providing for the manufacture of forming tubes, on a commercial scale, which have beads that terminate a desired distance inwardly (i.e. short of) the end edges of the forming tubes. This is accomplished in accordance with the present invention by cutting and asiding a predetermined length of bead cord material at the appropriate time during the tube manufacturing process, to interrupt the bead length so that each bead stops short of the end edges of the resulting forming tubes a desired distance, for example, approximately one-half inch from such end edges.

Figure 4:
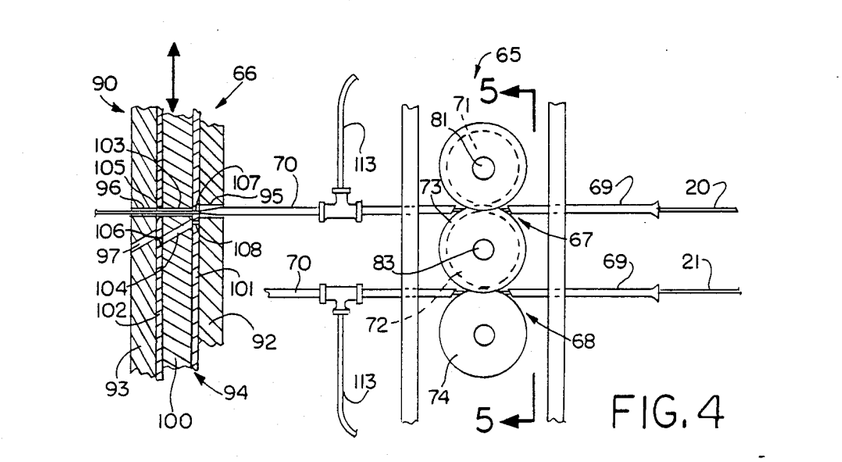
FIG. 4 is a schematic enlarged fragmentary horizontal section through the feed roll assembly and cutter assembly of FIG. 3.
Figure 5:
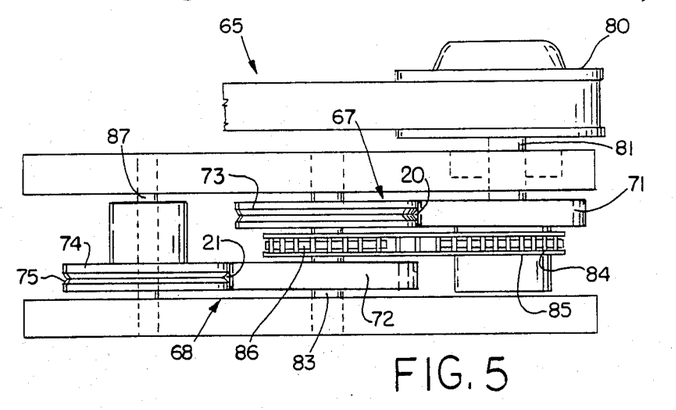
FIG. 5 is a schematic vertical section through the feed roll assembly of FIG. 4 taken generally along the plane of the line 5—5 thereof.
Figure 6:
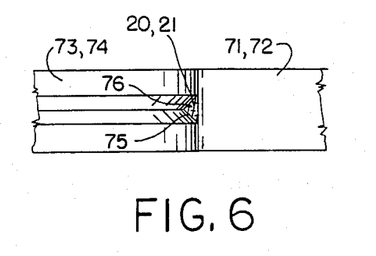
FIG. 6 is an enlarged fragmentary section through one of the two sets of feed rolls shown in FIG. 5.
Figure 7:
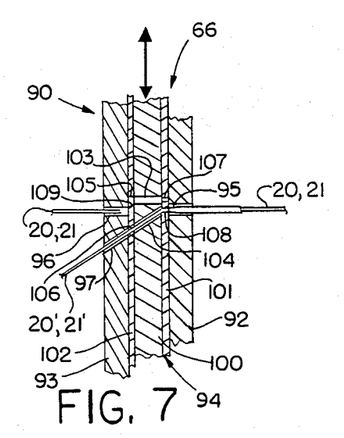
FIG. 7 is an enlarged fragmentary section through the bead cord cutter assembly of FIG. 4 but showing the cutter bar in a different position.

To that end, the tube forming apparatus 10 of the present invention includes a bead cord material feed mechanism 65, shown in greater detail in FIGS. 3–6, for continuously feeding one or more continuous lengths of the cord material, depending on the number of bead cords being laid down, and a bead cord material cutter mechanism 66, also shown in FIGS. 3 and 4 and also in FIG. 7, for cutting and asiding a predetermined length of each cord material on command. In the preferred embodiment disclosed herein, two continuous lengths of cord material 20, 21 are used to lay down two beads 3, 4 between the desired tube plies. Each cord material 20 and 21 is driven by a set of feed rolls 67, 68, with guide tubes 69, 70 being provided both at the entry and exit sides of each set of feed rolls for guiding the cord material between the respective feed rolls and then through the cutter mechanism 66 as described hereafter.

The respective sets of feed rolls 67 and 68 include a drive roll 71 and 72 and a driven roll 73 and 74 driven by the respective drive roll. The outer diameter of each drive roll 71, 72 is desirably knurled (roughened) to increase its frictional contact with the associated driven roll 73, 74. Also, each driven roll 73, 74 has a notch 75 in its outer diameter (see FIG. 6) for receipt of the cord material 20, 21. Preferably, each notch 75 is generally V-shaped with tapered sides that form an angle of approximately 45° therebetween to provide a generally triangular shaped recess 76 with the cylindrical surface of the drive rolls 71, 72 to form the cord material 20, 21 into a generally corresponding triangular shape as schematically shown in FIG. 6 to give the cord material more rigidity so that the cord material can be more easily pushed through the guide tubes 69 and 70 as well as the guide tubes 22 and 45 previously described.

The feed rolls 67, 68 are desirably driven off the same drive pulley 26 used to drive the linkage mechanism 25. As best seen in FIGS. 2 and 5, this is accomplished by providing a drive pulley 80 on the mounting shaft 81 for one of the drive rolls 71 and connecting same to the linkage drive pulley 26 by means of a V-belt 82 or the like. The drive roll 72 for the other set of feed rolls 68 is desirably mounted on the same shaft 83 as the driven roll 73 of the first set 67 and is driven by means of a drive chain 84 interconnecting sprockets 85, 86 on each of the drive rolls 71, 72 (see FIG. 5). The driven roll 74 of the other set 68 is mounted on a separate shaft 87 with its outer diameter in frictional engagement with the outer diameter of its associated drive roll 72.

The bead cord cutter mechanism 66 also includes a separate cutter assembly 90, 91 for each continuous length of cord material. Each cutter assembly 90, 91 may be of identical construction, including a pair of side plates 92, 93 at the entry and exit sides of the cutter and a cutter bar 94 slidably received therebetween (see FIGS. 4 and 7). The entry side plate 92 has a straight hole 95 therethrough which is desirably tapped at the entry side for threaded receipt of one end of the exit guide tube 70 of the associated set of feed rolls 67. The exit side plate 93 also has a straight through hole in alignment with the straight through hole 95 in the entry side plate. In addition, the exit side plate 93 has a skewed hole 97 preferably in the same horizontal plane as the straight through hole 96 but extending at an angle, for example, of approximately 45°, relative to the straight hole 96 and slightly offset therefrom, for a purpose to be subsequently described.

The cutter bar 94 desirably consists of a center cutter slide plate 100 and a pair of replaceable hardened wear side plates 101, 102 on opposite sides thereof. Extending through the center plate 100 is a straight hole 103 and a skewed hole 104 similar to the straight and skewed holes 96 and 97 in the exit side plate 93. Likewise, the left cutter bar side plate 102 (as viewed in FIGS. 4 and 7) includes a straight hole 105 and skewed hole 106 therethrough in alignment with the respective straight and skewed holes 103, 104 in the center plate 100. The right cutter bar side plate 101, on the other hand, includes two through holes 107 and 108, one in alignment with the straight hole 103 through the center plate 100 and the other in alignment with the adjacent end of the skewed hole 104 in the center plate.

In order to feed the cord material 20, 21 between the tube plies 12, the cutter bar 94 of each cutter assembly 90, 91 must be in the position shown in FIG. 4 with the straight holes 103, 105, 107 through the cutter bar and straight holes 95, 96 through the entry and exit side plates 92, 93 in alignment with each other so as not to obstruct the passage of the cord material through the cutter assemblies. When the cord material is received between the plies, the continuous rotation of the tube material 14 by the drive belt 15 pulls the cord material between the plies at a rate somewhat faster than the rate at which the cord material would otherwise be pushed through the guide tubes by the feed roll mechanism 65. This is made possible due to the fact that the drive pulley 80 for the feed roll mechanism includes a one-way clutch type bearing which only drives in one direction so the feed drive rolls 71, 72 can be pulled faster than they are being driven by the drive pulley.

At the desired sequence during the tube forming process, an air cylinder 110 is actuated, which moves the cutter bar 94 from the FIG. 4 position to the FIG. 7 position. This brings the skewed holes 104, 106 in the cutter bar into alignment with the skewed hole 97 in the exit side plate 93 and with the through hole 95 in the entrance side plate 92. During such movement of the cutter bar from the FIG. 4 position to the FIG. 7 position, the hole 107 in the right cutter side plate 101, being somewhat smaller than the holes 103, 105 in the center plate 100 and left side plate 102, cuts the cord material and redirects the leading end of the newly cut cord material through the aligned skewed holes 97, 104, 106 while the trailing cut end of the previously advancing cord material is pulled from the cutter assembly by the tube plies. To prevent pinching of such trailing end after the first cut so that the trailing end can be pulled out of the cutter bar before the movement of the cutter bar completely closes off hole 105, hole 105 is desirably tapered (i.e. flared outwardly) at the left side of plate 102 as schematically shown at 109 in FIG. 7.

Figure 8:
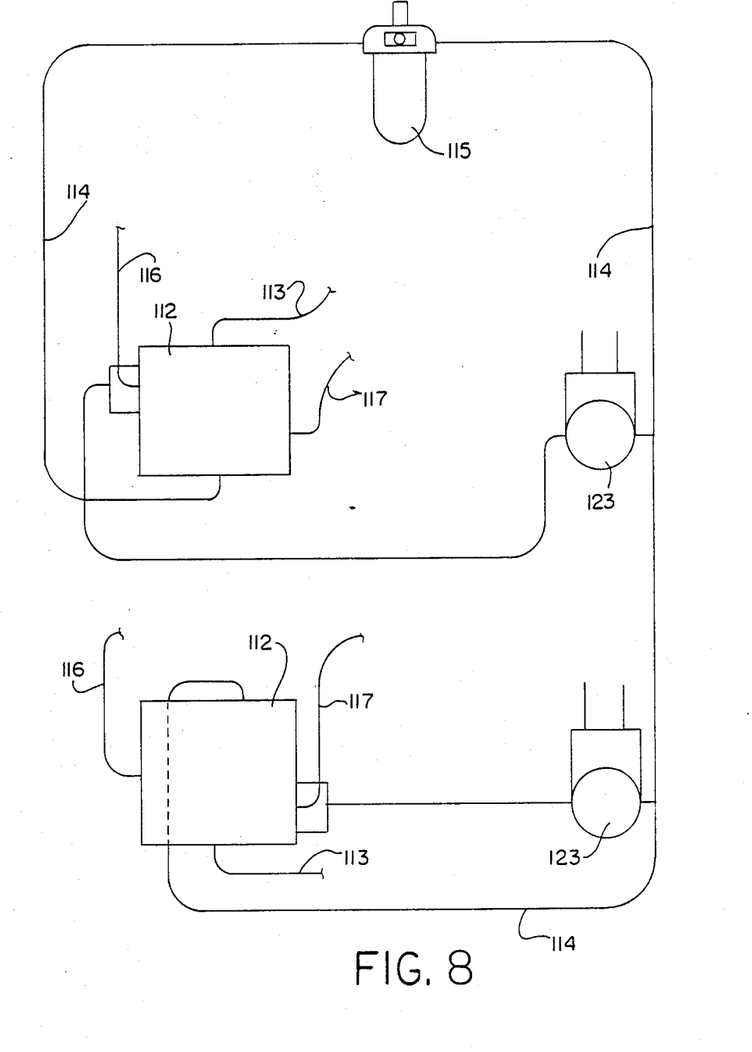
FIG. 8 is a schematic diagram of the fluid control circuit for operating the bead cord cutter assembly shown in FIGS. 3, 4 and 7.

After a predetermined interval, the cutter bar 94 is returned from the FIG. 7 position to the FIG. 4 position, during which the cord material is again cut by the right cutter bar side plate 101 and the asided cord material 20', 21' is blown out of the cutter assembly by the exhaust air from the air cylinders 110. Such exhaust air is exhausted by means of shifter valves 112 through feed lines 113 into the guide tubes 70 between the feed roll sets 67, 68 and cutter assemblies 90, 91 every time the air cylinders are actuated (see FIGS. 3, 4 and 8). The air lines 114 to the shifter valves 112 also desirably contain an air line lubricator 115 (FIG. 8), whereby the exhaust air that enters the cutter assemblies helps to lubricate the cutter blades as well as assisting in pushing both the scrap cord material 20', 21' and trailing cut end of the previously advancing cord material out of the cutter assemblies. Supply air is supplied to the air cylinders 110 through one of two air lines 116, 117, depending on the desired direction the cutter bar 94 is to be actuated.

Sufficient distance must be provided between the cutter assemblies 90, 91 and feed roll sets 67, 68 to take up the slack in the cord material during the cutting operation. While each cut is being made, the leading cut end is momentarily prevented from advancing by the cutter bar. At the same time, the cord material is being pushed forward by the feed rolls 71-74. The slack is taken up inside the exit guide tubes 70 which have an inner diameter somewhat greater than the outer diameter of the cords 20, 21 to permit the cord material to snake within the exit guide tubes during the cutting operation.

Figure 9:
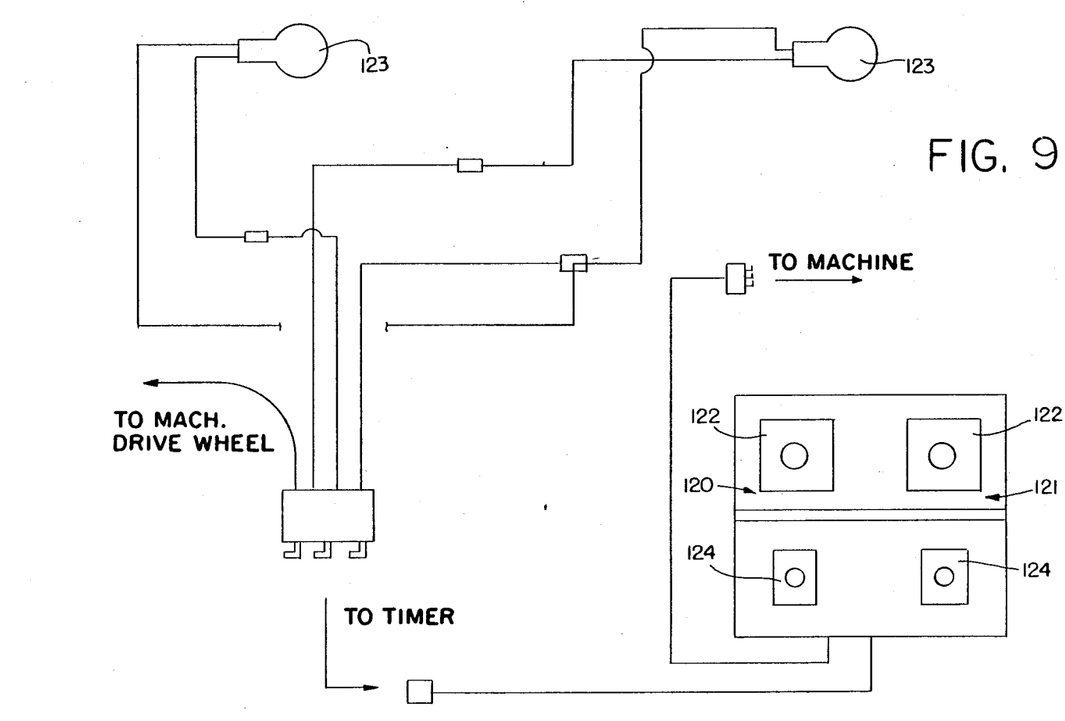
FIG. 9 is a schematic diagram of the electrical control circuit for controlling the operation of such bead cird cutter assembly.

Because of the manner in which the tube material 14 is formed on the mandrel 11 with the plies 12 and cords 20, 21 being fed at one end and the tube material being cut to the desired tube length at the other end, the sequencing or timing of the bead cord cutter assemblies is important in controlling the distance between the ends of the beads and the end edges of the tubes 1 as the tubes are cut from the tube material. In the preferred embodiment disclosed herein, this is accomplished utilizing two pairs of electrical timers 120, 121 (see FIG. 9), one pair for each cutter assembly 90, 91. The electric eye 57, in addition to activating the tube cutters 55 which move with the tube material 14 during the cutting operation and then return to their original "at rest" position, also activates a primary timer 122 of each pair upon sensing the outboard end of the tube material. When the respective primary timer 122 times out, the associated solenoid valve 123 is activated to shift the associated shifter valve 112 to send air to one side of the associated air cylinder 110 through one of the air lines 116, 117, causing the associated cutter bar 94 to move from the FIG. 4 to the FIG. 7 position to cut the associated cord in the manner previously described. Also, when each primary timer 122 times out, it activates an associated secondary timer 124 which, upon timing out, reactivates the associated solenoid valve 123. This in turn reverses the associated shifting valve 112, causing the associated air cylinder 110 to return the cutter bar 94 back to its original position, cutting and asiding a desired length of cord material 20', 21' to create a cord void where desired along the length of the tube material so that when each tube 1 is cut, the beads 3, 4 terminate some desirable distance from each end edge of the tube.

After the second cut of the asided cord material 20', 21', the leading end of the cord material 20, 21 must be pushed through the respective cutter assemblies 90, 91 and cord guide tubes 22, 45 by the feed mechanism 65 until the cords are received between the desired tube plies 12. Thereafter, the tube plies resume pulling the cord material between the plies at a faster rate than the rate at which the cord material is being advanced by the feed mechanism in the manner previously described.

Figure 10:
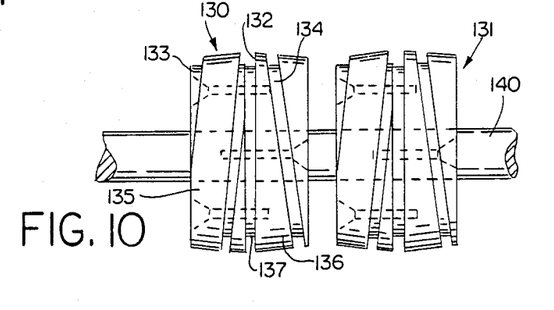
FIG. 10 is an enlarged schematic end elevation view of the bead pressing roll assembly which also forms part of the apparatus of the present invention.

Further in accordance with the invention, bead pressing roll assemblies 130, 131, shown in FIGS. 2 and 10, are desirably used to roll the tube plies 12 on opposite sides of the beads 3, 4, to ensure that the tube plies are adhered together closely adjacent the beads and that the beads protrude outwardly to the desired extent with respect to the outer periphery of the tube. If the beads 3, 4 were continuous, the bead pressing roll assemblies would only need to be provided with a single annular groove to track the beads. However, because the beads of the present application are interrupted as previously discussed, each bead pressing roll assembly 130, 131 desirably includes, in addition to a center groove 132 for receiving the respective beads, spiral grooves 133, 134 of opposite hand extending from opposite ends of each roll assembly to the center for picking up the beads from either end after each break (interruption) in the beads. Such bead pressing roll assemblies 130, 131 may be formed, for example, utilizing two separate rollers 135, 136, one having a spiral groove 133 of one hand and the other a spiral groove 134 of the other hand, and connecting such rollers to opposite sides of a center washer 137 having a slightly smaller outer diameter to form the center groove 132 therebetween as shown in FIG. 10.

There should of course be one such bead pressing roll assembly for each bead. In this case, since there are two beads 3, 4, two bead pressing roll assemblies 130, 131 are provided. Both such assemblies may be mounted on a common shaft 140 and supported on one end of a cantilevered bar 141, with a pneumatic cylinder 142 connected to the other end of the bar as schematically shown in FIG. 2. This permits the bead pressing roll assemblies to be pneumatically pushed into engagement with the outer surface of the tube with a predetermined amount of force, and the lifting of the bead pressing roll assemblies out of the way to facilitate changing of the mandrell II, and so on.

The bead pressing roll assemblies 130, 131 must be free to move laterally to some extent on shaft 140 to permit them to pick up (and track) the interrupted beads. Where the bead weave pattern is generally regular, the associated bead pressing roll assembly need only have a maximum permissible lateral movement, for example, of approximately three-quarter inch, whereas if the bead weave pattern is irregular, the bead pressing roll assembly should have a greater maximum permissible lateral movement, for example, about one inch to one and one-half inches maximum.

From the foregoing, it will now be apparent that the tube forming apparatus and method of the present invention provides for the manufacture, on a commercial scale, of forming tubes of high quality and uniformity including one or more beads on the outer periphery of the tubes which terminate within some desirable distance, for example, approximately one-half inch, from the end edges of each tube.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

I claim:

1. Apparatus for making forming tubes with bead means on the outer periphery of such forming tubes comprising winding means for winding plural tube plies around a mandrel and advancing the tube plies along the mandrel toward an outboard end thereof to form the tube plies into tubular material, feed means for feeding bead cord material between selected plies to form such bead means, tube cutter means for cutting forming tubes of a predetermined length from such tube material and removing such forming tubes from the outboard end of the mandrel, and bead cord cutter means for cutting and asiding a predetermined length of the bead cord material at predetermined time intervals while the bead cord material is continuously fed to said bead cord cutter means to redirect such predetermined length of bead cord material away from the tube plies so that the bead means terminates a predetermined distance from the end edges of the forming tubes which are cut from such tube material.

2. The apparatus of claim 1 further comprising control means for activating said bead cord cutter means at such predetermined time intervals.

3. The apparatus of claim 2 wherein said control means comprises sensor means for detecting when the end of such tube material reaches a predetermined point, and timer means activated by said sensor means to control the operation of said bead cord cutter means.

4. The apparatus of claim 3 wherein said timer means includes a primary timer which is activated by said sensor means to time out, and a secondary timer, said primary timer, upon timing out, including means for activating said bead cord cutter means to make a first cut of the bead cord material, and means for activating said secondary timer to time out, said secondary timer, upon timing out, including means for activating said bead cord cutter means to make a second cut of the bead cord material.

5. The apparatus of claim 4 wherein said bead cord cutter means includes first passage means for directing the bead cord material received from said feed means toward the tube plies, and second passage means for redirecting the bead cord material away from the tube plies after said bead cord cutter means has been activated to make such first cut.

6. The apparatus of claim 5 wherein said bead cord cutter means includes means for redirecting the bead cord material through said first passage means after said bead cord cutter means has been activated to make such second cut.

7. The apparatus of claim 6 wherein said bead cord cutter means includes entry and exit plates and a cutter bar movable between said plates, said entry and exit plates and said cutter bar each having substantially straight holes therethrough which are in substantial alignment with each other whn said cutter bar is in a first position to define with first passage means, and said exit plate and said cutter bar also having skewed holes which are in alignment with each other and with said straight hole in said entry plate when said cutter bar is in a second position to define said second passage means.

8. The apparatus of claim 7 wherein said bead cord cutter means includes means for making such first cut and redirecting the leading cut end of the bead cord material through said second passage means during movement of said cutter bar from such first position to such second position.

9. The apparatus of claim 8 wherein said bead cord cutter means also includes means for making such second cut and redirecting the leading cut end of the bead cord material through said first passage means during return movement of said cutter bar from such second position back to such first position.

10. The apparatus of claim 9 further comprising means for removing a length of bead cord material from said second passage means following such second cut.

11. The apparatus of claim 10 further comprising air cylinder means for actuating said bead cord cutter means, and said means for removing a length of bead cord material from said second passage means comprises valve means for directing exhaust air from said air cylinder means through said bead cord cutter means to blow the cut length of bead cord material out of said bead cord cutter means following such second cut.

12. The apparatus of claim 8 wherein the winding of the tube plies around said mandrel pulls the trailing cut end of the bead cord material from said bead cord cutter means following such first cut.

13. The apparatus of claim 12 wherein said straight hole in said cutter bar is tapered at the end closest to said exit side plate to permit the trailing cut end of the bead cord material to be pulled out of said bead cord cutter means before said first passage means is closed off during movement of said cutter bar from such first positin to such second position.

14. The apparatus of claim 1 wherein said feed means comprises a pair of feed rolls in driving engagement with each other, one of said feed rolls having a peripheral annular notch for receipt of the cord bead material, and the other of said feed rolls having a generally cylindrical outer surface.

15. The apparatus of claim 14 wherein said notch in said one feed roll is generally V-shaped to form a generally triangular shaped recess with the cylindrical outer surface of said other feed roll which shapes the bead cord material into a generally corresponding triangular shape to give the bead cord material more rigidity to facilitate pushing of the bead cord material by said feed means.

16. The apparatus of claim 14 wherein there are two pairs of said feed rolls for feeding two bead cords materials, and two of said bead cord cutter means for sequentially cutting and asiding a predetermined length of each bead cord material upon command.

17. The apparatus of claim 17 wherein said one feed roll of each pair is a driven roll and the other feed roll of each pair is a drive roll, and means are provided for commonly driving the drive roll of one pair and said winding means.

18. The apparatus of claim 17 wherein said driven roll of said one pair is mounted on a common shaft with said drive roll of said other pair, and both of said drive rolls have drive sprockets connected together by chain means for driving both of said drive rolls in unison.

19. The apparatus of claim 1 further comprising bead pressing roll means for rolling the tubular material on opposite sides of said bead means, said bead pressing roll means comprising roll means having an annular peripheral center groove for receiving said bead means, and peripheral spiral grooves of opposite hand extending from opposite ends of said roll means to said center groove.

20. The apparatus of claim 19 wherein said roll means comprises two separate rollers having peripheral spiral grooves of opposite hand, said rollers being connected together with a center washer between said rollers, said center washer having a smaller outer diameter than said rollers to form said center groove between said rollers.

21. The apparatus of claim 20 wherein said bead pressing roll means includes means for permitting limited lateral movement of said roll means for picking up and tracking such bead means between interruptions.

22. The apparatus of claim 19 wherein two such bead cord material are intermittently fed between selected plies to form two interrupted bead means, and two of said roll means are provided for picking up and tracking each of said bead means between interruptions.

23. The apparatus of claim 22 further comprising means for depositing one such bead cord material in a weave pattern between selected plies.

24. A method of making forming tubes with bead means in the outer periphery of such forming tubes comprising the steps of winding plural tube plies around a mandrel, advancing the tube plies along the mandrel toward an outboard end thereof to form the tube plies into tubular material, feeding bead cord material between selected plies to form such bead means, cutting forming tubes of a predetermined length from such tube material and removing such forming tubes from the outboard end of such mandrel, and cutting and asiding a predetermined length of the bead cord material at predetermined time intervals during a continuous feeding of the bead cord material to redirect such predetermined length of the bead cord material away from the tube plies so that the bead means terminates a predetermined distance from the end edges of the forming tubes which are cut from such tube material.

25. The method of claim 24 wherein a continuous supply of bead cord material is supplied to cutter means which cut and aside a predetermined length of the bead cord material at predetermined time intervals to redirect such predetermined length of the bead cord material away from the tube plies.

26. The method of claim 24 further comprising the step of activating a timer means when the end of the tube material reaches a predetermined point to control the sequential cutting of the bead cord material during its advancement toward the mandrel.

27. The method of claim 26 wherein the timer means includes a primary timer which is activated by a sensor means when the end of the tube material reaches a predetermined point to time out the primary timer, and a secondary timer, the primary timer, upon timing out, causing the bead cord cutter means to make a first cut of the bead cord material, and causing the secondary timer to time out, and the secondary timer, upon timing out, causing the bead cord cutter means to make a second cut of the bead cord material.

28. The method of claim 27 wherein the bead cord cutter means includes first passage means which directs the bead cord material received from the feed means toward the tube plies, and second passage means which redirects the bead cord material away from the tube plies after the first cut.

29. The method of claim 28 further comprising the step of redirecting the bead cord material through the first passage means after the second cut.

30. The method of claim 29 further comprising the step of discarding a cut length of the bead cord material which is formed each time the bead cord cutter means makes the first and second cuts.

31. The method of claim 30 further comprising the step of using exhaust air from air cylinder means that is used to actuate the bead cord cutter means to blow the cut length of bead cord material out of the bead cord cutter means after the second cut.

32. The method of claim 24 further comprising the step of picking up and tracking such bead means between interruptions, and rolling the tubular material on opposite sides of the bead means during the tracking of such beads means.

33. Apparatus for making forming tubes with bead means on the outer periphery of such forming tubes comprising winding means for winding plural tube plies around a mandrel and advancing the tube plies along the mandrel toward an outboard end thereof to form the tube plies into tubular material, feed means for feeding bead cord material between selected plies to form such bead means, tube cutter means for cutting forming tubes of a predetermined length from such tube material and removing such forming tubes from the outboard end of the mandrel, means for interrupting the feed of the bead cord material between the selected plies at predetermined intervals so that the bead means terminates a predetermined distance from the end edges of the forming tubes which are cut from such tube material, and bead pressing roll means for rolling the tubular material on opposite sides of said bead means, said bead pressing roll means comprising roll means having an annular peripheral center groove for receiving said bead means, and peripheral spiral grooves of opposite hand extending from opposite ends of said roll means to said center groove.

34. The apparatus of claim 33 wherein said roll means comprises two separate rollers having peripheral spiral grooves of opposite hand, said rollers being connected together with a center washer between said rollers, said center washer having a smaller outer diameter than said rollers to form said center groove between said rollers.

35. The apparatus of claim 33 wherein said bead pressing roll means includes means for permitting limited lateral movement of said roll means for picking up and tracking such bead means between interruptions.

36. The apparatus of claim 33 wherein two such bead cord material are intermittently fed between selected plies to form two interrupted bead means, and two of said roll means are provided for picking up and tracking said bead means between interruptions.

* * * * *